United States Patent [19]
Freeman

[11] 3,799,047
[45] Mar. 26, 1974

[54] WAFFLE BAKING APPARATUS

[76] Inventor: Gerald R. Freeman, 1721 Norman St., Wenatchee, Wash. 98901

[22] Filed: Sept. 11, 1972

[21] Appl. No.: 287,945

[52] U.S. Cl. .................................. 99/332, 99/374
[51] Int. Cl. ....................... A47j 27/62, A21b 5/02
[58] Field of Search ............ 99/325, 326, 332, 334, 99/335, 372–373, 374–375, 376–377, 378–379, 380–381, 382–383, 384, 391–393, 443; 74/22, 47, 54, 66, 68

[56] References Cited
UNITED STATES PATENTS

| | | | |
|---|---|---|---|
| 1,534,430 | 4/1925 | Wells | 99/374 X |
| 1,974,204 | 9/1934 | Cooter | 99/383 X |
| 1,990,412 | 2/1935 | Merritt | 99/381 X |
| 2,059,133 | 10/1936 | Merritt | 99/374 UX |
| 2,191,275 | 2/1940 | Fink | 99/393 X |
| 2,314,872 | 3/1943 | Dickey | 99/374 X |
| 2,788,427 | 4/1957 | Fresone et al. | 99/332 X |

*Primary Examiner*—Peter Feldman
*Assistant Examiner*—Arthur O. Henderson
*Attorney, Agent, or Firm*—John W. Kraft

[57] ABSTRACT

The waffle baking apparatus includes waffle-baking griddle plates, timing means, waffle-plate lifting means, and waffle-ejecting means. The timing means may include indicating indicia and a timing override switch.

3 Claims, 6 Drawing Figures

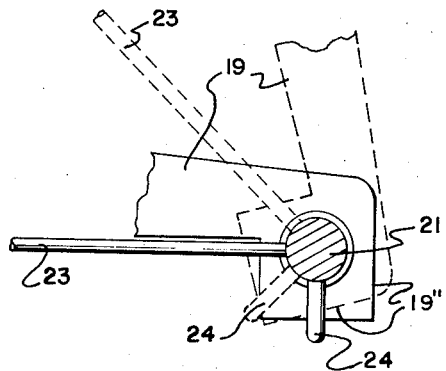
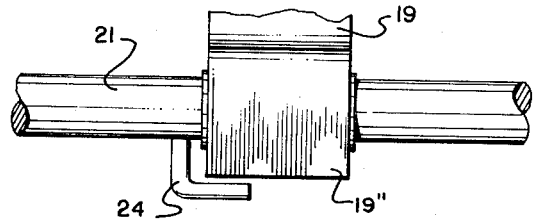
FIG. 4              FIG. 5
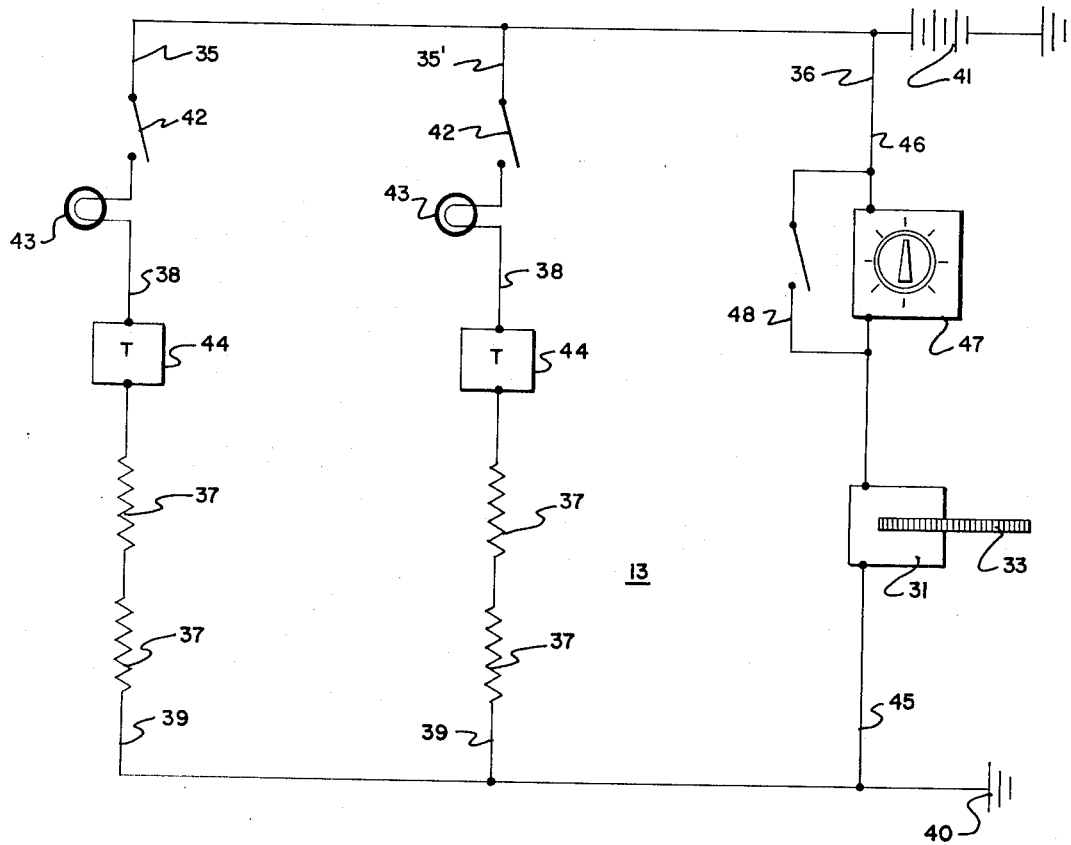
FIG. 6

WAFFLE BAKING APPARATUS

FIELD OF INVENTION

The present invention relates to waffle baking apparatus and more particularly to waffle baking apparatus having timing means and waffle-ejecting means.

DESCRIPTION OF THE PRIOR ART

Means commonly used and employed to bake waffles and the like include a pair of suitably heated, opposingly disposed griddle plates. Some waffle baking apparatus may include timing means, plate-lifting means, and waffle-ejecting means. Timing means have included warning lights, bells and the like, and servo-mechanisms to actuate the griddle plates. Servomechanisms, operable to raise, usually, the upper griddle plate, employ complex plate-lifting drive means, shift drive means tending to contribute to costs of fabrication and maintenance of automatic waffle baking apparatus. Drive means, commonly, fully open the griddle plates, thus contributing to heat loss and to time required to prepare the baking apparatus for the mixed waffle in sequence. Servomechanisms merely raise the upper griddle plate, thus leaving the waffle product on the heated lower griddle plate on which it continues to cook. Timed servomechanisms have commonly not been provided with servo-override means operable to open the waffle baking apparatus in a time shorter than the preselected baking time. Waffle product ejecting means commonly used to remove a waffle from the baking apparatus may be a manually operated fork, or the like, or an automatic product ejecting means provided in the baking apparatus. Automatic ejecting means have included a variety of tongued probes and ejector shoes. Probes and ejector shoes tend to interfere with the induction of heat through the batter, and have interfered with uniform cooking.

Accordingly, it is an object of the present invention to provide waffle baking apparatus having timing means, plate-lifting means, and waffle-ejecting means operable to raise and retain a waffle away from the lower griddle plate of a waffle baking apparatus.

It is a further object of the present invention to provide override means which may be actuated to open the waffle baking apparatus before a preselected baking time has elapsed.

It is a further object of this invention that the waffle-ejecting means be so configured as not to interfere with induction of heat from the plate into the waffle batter.

It is an object of this invention to provide waffle-ejecting means which is operable to retain the waffle product between the griddle plates to minimize heat loss between the plates and from the waffle.

These and other objects shall become apparent from the description following, it being understood that modifications may be made without affecting the teachings of the invention here set out.

SUMMARY OF THE INVENTION

Generally, the waffle baking apparatus includes waffle-baking griddle plates, timing means, waffle-plate lifting means, and waffle-ejecting means. The timing means may include indicating indicia and a timing override switch.

A more thorough and comprehensive understanding may be had from the detailed description of the preferred embodiment when read in connection with the drawings forming a part of this specification.

BRIEF DESCRIPTION OF THE DRAWINGS

FIG. 4 is a fragmentary side elevational view of the hinging means and waffle-raising prongs of this invention including the hinging means and waffle-raising prongs shown in their uppermost travel in broken lines for illustrative purposes.

FIG. 5 is a fragmentary rear elevational view of the hinging means.

FIG. 6 is a schematic diagram of the electrical and servoassembly of this invention.

DETAILED DESCRIPTION OF THE PREFERRED EMBODIMENT

Figure 1:
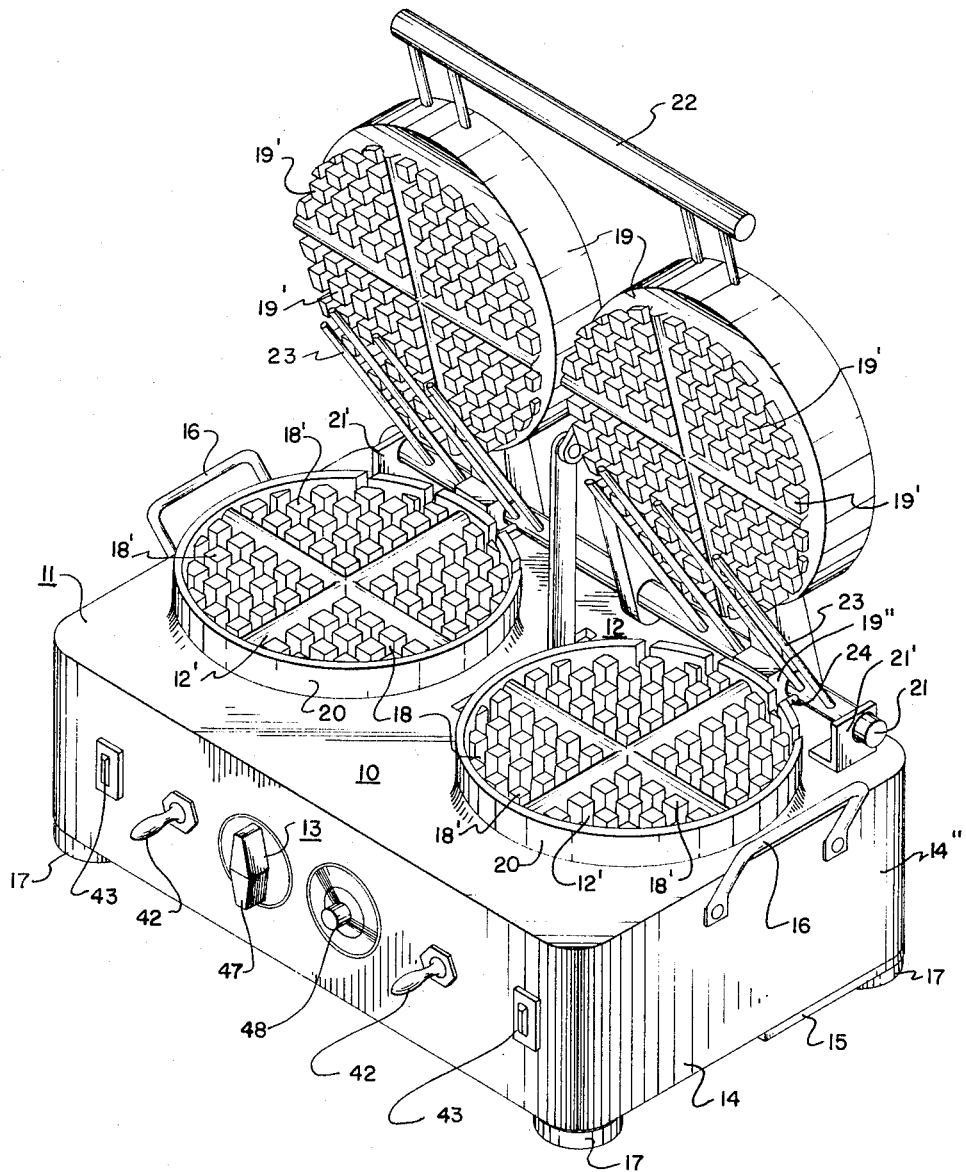
FIG. 1 is a right front perspective view of the waffle baking apparatus of this invention.
Figure 2:
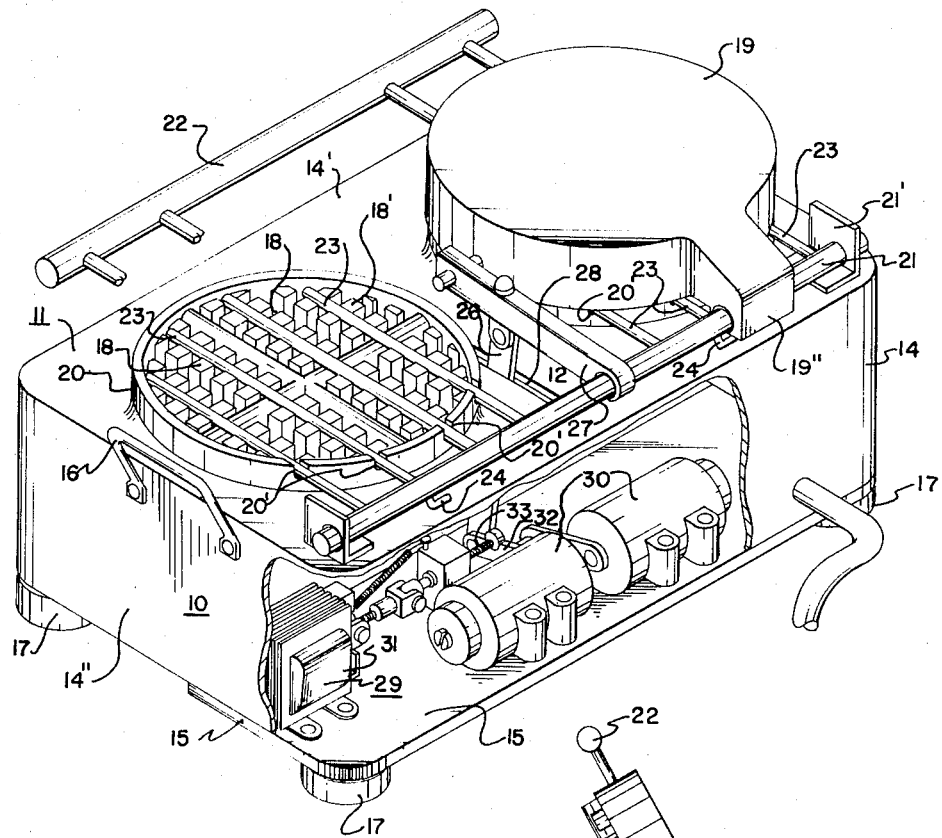
FIG. 2 is a left rear view of the waffle baking apparatus shown with a portion of the body-casing wall broken away to show the servo-assembly thereof.

Referring now to the drawings and more particularly to the FIGS. 1 and 2, the waffle baking apparatus of this invention is shown to advantage and generally identified by the numeral 10. The apparatus 10 comprises a housing assembly 11, a griddle assembly 12, and an electric control assembly 13. The housing assembly 11 includes a housing 14 and a base 15. The housing 14 comprises a top wall 14' and upstanding side walls 14" fastened to the top wall 14' to form a suitable rectilinear housing assembly 11. The base 15 comprises a horizontally disposed, plate-like member to which the housing 14 is fastened. The housing 14 may be provided at each of its terminal sides with carrying handles 16, and the base 15 may be provided on its lowermost terminal side with feet 17.

The griddle assembly 12 includes a pair of baking griddles 12'. The baking griddles 12' may be of any of a variety of perimeter shapes, such as a circle. Each griddle 12' comprises a bottom griddle plate 18 and a top griddle plate 19. The bottom griddle plate 18 is fixedly mounted in the top wall 14' of the housing 14. The plate 18 is provided with a pattern of projecting grids 18', in the manner common to waffle baking apparatus. The bottom plate 18 includes an upstanding circumferential rim 20 operable to retain batter disposed in a baking griddle 12'. The top griddle plate 19 is a similarly configured plate having projecting grids 19' which are operable to distally mate with the grids 18' when the lowermost terminal side of the plate 19 rests on the uppermost terminal edge of the rim 20, in the manner common to waffle baking apparatus.

The top plate 19 is journally mounted on bushing means to a hinge bar 21. The hinge bar 21 is disposed horizontally, distally parallel to the rearwardmost rectilinear side of the housing 14. The hinge bar 21 is journally mounted at each of its terminal ends on upstanding brackets 21' which are fastened to the uppermost terminal side of the top wall 14'. The forwardmost terminal sides of the respective plates 19 of the pair of griddles 12' are connected together by a handle bar 22. Each of the griddles 12' is provided with waffle-raising prongs 23 which are suitably fastened, distally at intervals on the hinge bar 21. As shown more clearly in the FIGS. 4 and 5, the raising prongs 23 may be provided with stop means operable to coact with the raising of the top griddle plate 19. The prongs 23 are fastened to the hinge bar 21 distally adjacent to opposite sides of a mounting portio 19'' of the plate 19. The mounting portion 19'' may be provided with a flat bottom-side, and the hinge bar 21 may be provided with a hooklike control rod 24 which may be carried distally beneath the flat bottom-side of the portion 19''. As shown in the FIG. 4, when the plate 19 is in its closed position, the prongs 23 are disposed horizontally between the plates 18 and 19. When the plate 19 is in its upstanding, open position, the plate 19 is rotated with respect to the prongs 23 until the flat bottom-side of the portion 19'' contacts the control rod 24, and the prongs 23 are held distally between both of the plates 18 and 19. When the top plate 19 is moved to its closed position, the support provided by the flat side of the portion 19'' is withdrawn; and the prongs 23 return to the closed horizontal position. The rim 20 includes vertically, distally disposed slots 20', shown to advantage in the FIG. 2, operable to receive the prongs 23. The prongs 23 are operable to lie between the grids 18' and 19' when the top plate 19 is in its closed position, as shown in the FIG. 2; and are operable to lie between the bottom plate 18 and the top plate 19 when the top plate 19 is in its open position.

Figure 3:
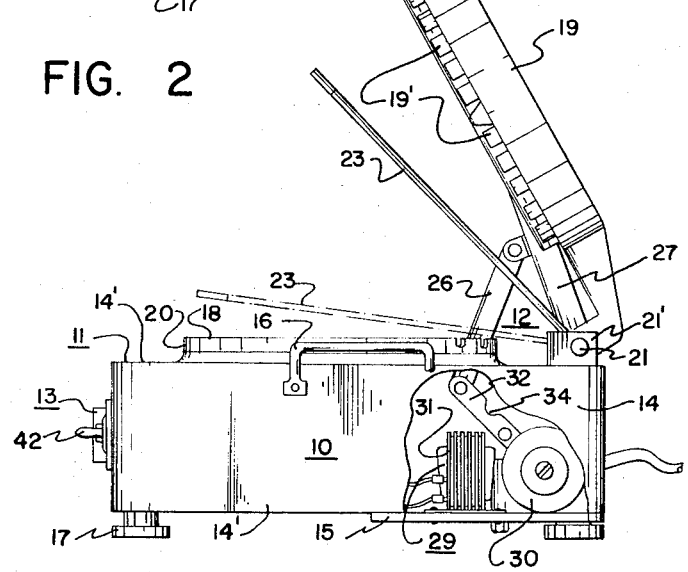
FIG. 3 is a side elevational view of the apparatus shown with a portion of the body-casing wall broken away to show a portion of the servo-assembly and with the waffle-raising prongs in broken lines for illustrative purposes.

Referring now to the FIGS. 2 and 3, the top plate 19 is mechanically raised by means of a lever linkage 26 which is pivotally mounted to a lever arm 27 which is suitable fastened to the hinge bar 21. The linkage 26 projects through a transversely disposed slot 28 in the top wall 14' of the housing 14. The lever linkage 26 is actuated by a servo-subassembly 29. The servosubassembly includes a coil-spring cell 30 and a servomotor 31. The spring cell 30 and the servomotor 31 are mounted to the uppermost terminal side of the base 15. The spring cell 30 includes a lever arm 32 which is pivotally mounted to the lever linkage 26 distally from the lever arm 27. The spring cell 30 is operable to urge its lever arm 32 in an upward, rearward direction of rotation. It is to be understood that the strength of the spring cell 30 is powerful enough to raise the top plates 19. The servomotor 31 includes a transversely disposed motor shaft 33. The terminal end of the shaft 33 is operable to engage a suitable slot 34 disposed in the uppermost terminal side of the spring cell lever arm 32, and is operable to hold the lever arm 32 in a suitable downward position. In operation, the servomotor 31, controlled in a manner hereinafter described, is operable to withdraw the shaft 33 sufficiently to disengage its terminal end from the slot 34 and to permit the lever arm 32 to rotate as set out above.

Referring now to the FIG. 6, the electric control assembly 13 includes a pair of identical heating elements 35 and 35' and servo means 36. The heating elements 35 and 35' are disposed in the griddles 12' respectively. A typical heating element 35 comprises heating coils 37 and 37' disposed in the bottom griddle plate 18 and the top griddle plate 19 respectively. The coils 37 and 37' of the typical element 35 may be connected in series between a power wire 38 and ground wire 39. Ground wires 39 of the elements 35 and 35' may be connected to the same ground 40. The power wire 38, supplied with power from a suitable source, such as a power source 41, is provided in order from the source 41 to the element 35 with a switch 42 and a monitor light 43, both also shown in the FIG. 1, and a thermostat 44. In operation, the switch 42 may be selectively closed to activate the monitor light 43 and the coils 37 and 37' of the element 35. It is to be understood that both of the elements 35 and 35' of the respective griddles 12' may be operated independently through a switch 42 provided in the circuit of each.

The servo means 36 is operable to control the servomotor 31. The servomotor 31 may be a substantially commonly known solenoid. The servomotor 31 is connected to a ground 45 which may be connected between the ground 40 and a suitable source of power, such as a power wire 46, connected to the power source 41. The servomotor power wire 46 includes an electric timer 47 and an override switch 48 disposed about the timer 47. In operation, the top plate 19 may be closed, as set out above, and the timer 47 set for a suitable baking time. The timer 47 may be overridden to activate the servomotor 31 and, thus, to open the top plate 19 by closing the override switch 48.

In operation, either, or both, of the respective griddles 12' may be heated by means of the heating elements 35 and 35' by closing the switch 42. A waffle may be made by disposing batter on the bottom plate 18 and closing the top griddle plate 19. The timer 47 may then be set for a suitable baking time, at the end of which the timer 47 is operable to activate the servomotor 31, resulting in the withdrawal of the motor shaft 33, thus permitting the top griddle plate 19 to rise and simultaneously rotate the hinge bar 21 and raise the prongs 23.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A waffle baking apparatus comprising a housing assembly having a base, upstanding side walls fastened to said base, and a top wall fastened at the uppermost terminal ends of said side walls;

a griddle assembly including a bottom griddle plate mounted to said top wall, a top griddle plate fastened to a hinge bar, said hinge bar being journally mounted on upstanding brackets to said top plate, means for lifting said top griddle plate, said means having a suitable spring cell provided with an arm pivotally connected by means of a lever linkage to a suitably projected lever arm fastened to said hinge bar, and waffle-raising prongs, said prongs being mounted on said hinge bar, said raising prongs being operable to lie between said bottom griddle plate and said top griddle plate when said plates are in a closed position, said prongs having stop means operable to coact with said top griddle plate to stand between said bottom griddle plate and said top griddle plate when said top griddle plate is in its upstanding position; and an electric control assembly provided with power from a suitable source, said electric control assembly including heating elements having a heat coil disposed in each of said bottom and top griddle plates, thermostat means, and a switch to selectively control the operation of said heating element, and servo means operable to retain and to control said spring cell, said servo means having a servomotor including a shaft operable to engage said spring cell arm and to be withdrawn by said servomotor, said servo means having a timer operable to activate said servomotor after a suitable predetermined time has elapsed, and an override switch connected about said timer to selectively activate said servomotor before said elapsed time.

2. The apparatus of claim 1 including a pair of griddle assemblies having suitable electric control assemblies.

3. The apparatus of claim 2 wherein each of said griddle assemblies is provided with a switch to selectively turn on both griddle plates and alternately activate said heating elements of said griddle assemblies, and wherein said top griddle plates and waffle-raising prongs of said griddle assemblies are connected to a common hinge bar, and wherein said top griddle plates are connected by a common handle bar.

* * * * *